United States Patent [19]
Valeh

[11] 4,197,925
[45] Apr. 15, 1980

[54] MECHANICAL ENERGY DEVICE

[76] Inventor: Seyed M. H. Valeh, Shahrookh St. #64, Tehran, Iran

[21] Appl. No.: 793,289

[22] Filed: May 3, 1977

[51] Int. Cl.² .............................................. F03G 1/00
[52] U.S. Cl. ......................................................... 185/9
[58] Field of Search .................................. 185/9, 10

[56] References Cited

U.S. PATENT DOCUMENTS

| | | | |
|---|---|---|---|
| 300,425 | 6/1884 | Wise | 185/9 |
| 471,888 | 3/1892 | Parker | 185/9 |
| 651,021 | 6/1900 | Silvey | 185/9 |
| 837,815 | 12/1906 | Esch | 185/9 |
| 1,259,262 | 3/1918 | Meiro | 185/9 |

*Primary Examiner*—Allan D. Herrmann
*Attorney, Agent, or Firm*—Arthur W. Fisher, III

[57] ABSTRACT

A mechanical energy device comprising a plurality of energy modules operatively interconnected to generate a mechanical energy output in response to a mechanical energy input. Each energy module comprises a central shaft assembly and power assembly which cooperatively generate the power stroke, a crank lifter assembly and crank speed control assembly coupled to the crank lifter assembly to generate the mechanical energy output.

9 Claims, 15 Drawing Figures

MECHANICAL ENERGY DEVICE

This application is a substitute application for application Ser. No. 621,738 now abandoned.

BACKGROUND OF THE INVENTION

1. Field of the Invention

A mechanical energy device comprising a plurality of energy modules operatively interconnected to generate a mechanical energy output in response to a mechanical energy input.

2. Description of the Prior Art

Historically, various machinery and mechanical devices have employed hydro-electric or hydrocarbon fuel as the energy source to power such devices. Generally, these devices or systems include compressors and electric motors which have relatively expensive initial costs, are noisy in operation and high in operating costs. Further, such components are subject to operational malfunctions requiring costly repair.

The additional shortcoming of the geographic limitations of hydro-electric power is obvious. Of course, the environmental factors associated with hydrocarbon fuel systems are increasing the cost of operation. Moreover, these costs have recently been compounded with the limited supply of petroleum.

Other mechanical devices such as clocks employ counterweights and springs to drive the mechanical components for limited periods of time. Due to the particular structure and mass involved such structures are of limited use.

However, with proper counter-balancing, masses and turning moments of a mechanical energy device may be designed to generate any amount of power for practical applications in response to a mechanical energy input. This input energy consists of certain numbers of long life compression and tension spring.

SUMMARY OF THE INVENTION

The present invention relates to a mechanical energy device. More specifically, the mechanical energy device comprises a central shaft assembly, crank lifter assembly, crank control assembly, power assembly and output drive assembly integrated to generate a mechanical energy output for a sustained period of time in response to its mechanical input.

The central shaft assembly and power assembly cooperatively create the mechanical motion of the mechanical energy device through a crank and spring in operative cooperation with an interrupted central shaft and central gear. Under the control of the crank lock means and central gear lock means, the crank follows a semicircular path (power stroke) in the first and second quadrants (recovery stroke). More particularly, the central shaft assembly selectively holds and releases the crank and central gear during rotation such that during rotation one-half revolution the separators cause the crank, central shaft and central gear to lock together and rotate as a unit and during one-half revolution all three rotate independent of each other.

The speed of the cranks in both the circular and elipitical paths are governed by the crank lifter assembly and the crank speed control assembly so that the speed of the cranks in both paths is equal. Consequently, as one crank leaves its circular division point, the next adjacent crank rotates in its position. Thus, the total active power of the first active crank remains essentially constant in the mechanical energy device as more fully described hereinafter.

Each crank lifter assembly comprises a main shaft and a main gear mounted on the main shaft. The main shaft is parallel to central shaft such that the teeth of the central and main gears are operatively coupled. The crank lifter assembly further includes lifter pulley and crank lifter lock means having a pair of separators which govern the motion of the crank lifter pulley so that in each one-half revolution it unites with the main shaft and in its next one-half revolution it rotates freely on the main shaft.

The crank speed control assembly comprises crank governor, governor rack, governor rail, first governor or upper interconnecting element and governor support which is mounted on a frame. The crank governor assembly comprises two pair of substantially parallel gears in combination with a pair of substantially parallel rollers mounted on three substantially parallel shaft means. In addition, a governor pulley is mounted on the shaft means between the gears. The governor gears are disposed to ride on parallel tracks while the roller is disposed to ride on substantially parallel governor rails.

As previously stated, the crank lifter assembly and crank speed control assembly rotate the crank through the third and fourth quadrant.

The power assembly may comprise a tension spring and tying means to create the motive power of the mechanical energy device.

In operation, the crank rotates in a circular path with the crank, central gear, central shaft interlocked by the crank lock means and control gear lock means in quadrants one and two during the power stroke. Then, the crank follows an elliptical path in quadrants three and four during the recovery stroke when the central gear separates from the central shaft as the central gear lock means and crank lock means moves to the second position under the influence of the separators as previously described.

Simultaneously, the crank lifter assembly lock means locks the crank lifter take-up pulley to the main shaft taking up the lower interconnecting element thereon pulling the crank speed control assembly taking up upper interconnecting element on governor pulley. This continues throughout the travel of the crank to take up a total of twelve inches of interconnecting elements corresponding to the twelve inches of upward vertical travel of the crank during the recovery stroke.

As previously described, the plurality of energy modules are operatively interconnected intermediate gears or intermeshing main and central gear. Thus, each energy module is mechanically coupled to each other on the plurality of energy modules. As a result, each of the main shafts are continuously rotating under the power of the five active crank shaft assemblies. The mechanical power is taken off the output drive means coupled to the main shafts.

Thus, once the mechanical energy device is actuated, a mechanical energy output is generated until the initial energy input is abated.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying energy device.

Similar reference characters refer to similar parts throughout the several views of the drawings.

DETAILED DESCRIPTION OF THE PREFERRED EMBODIMENT

Figure 1:
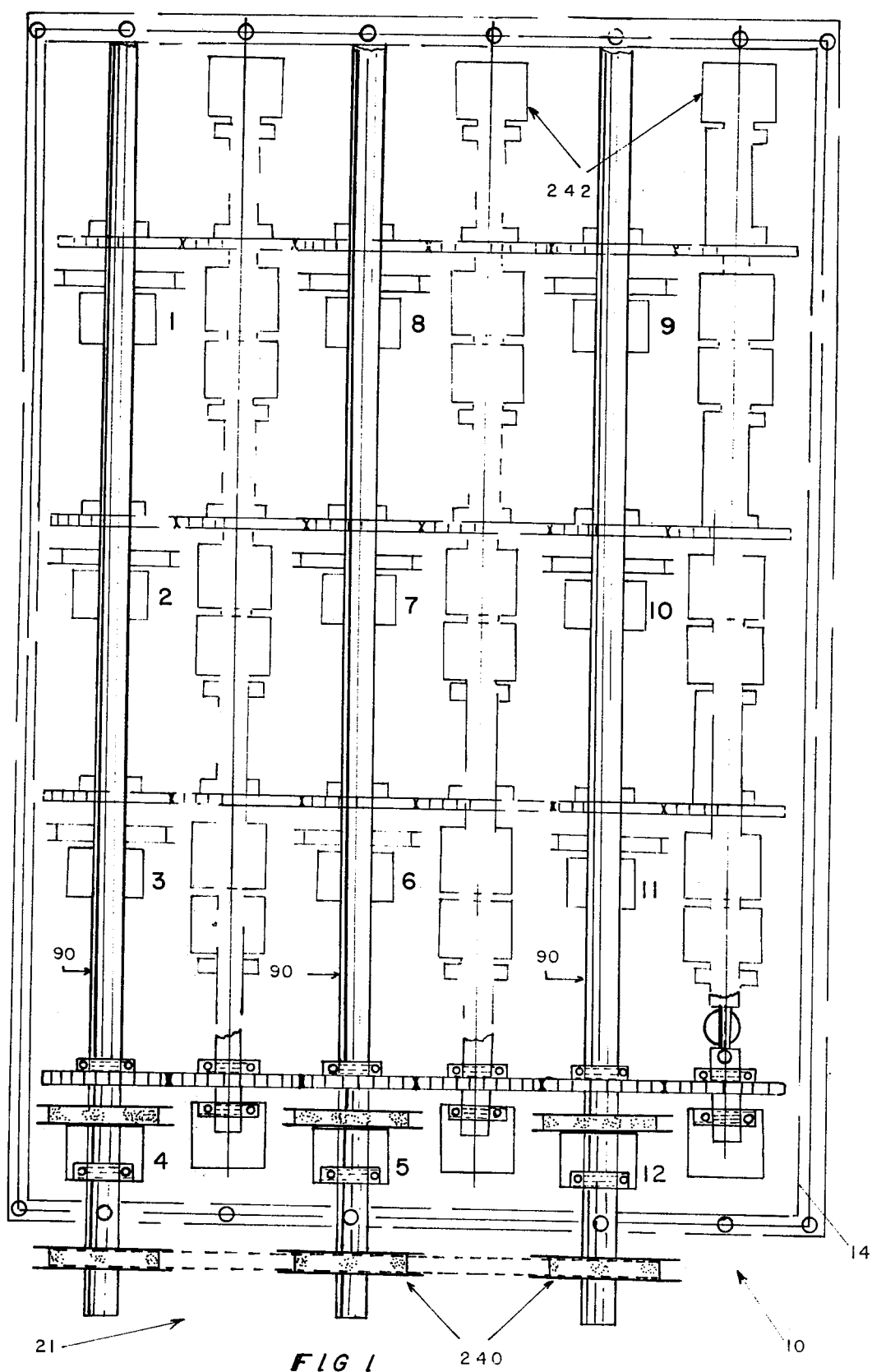
FIG. 1 is a top view of a mechanical energy device.
Figure 2:
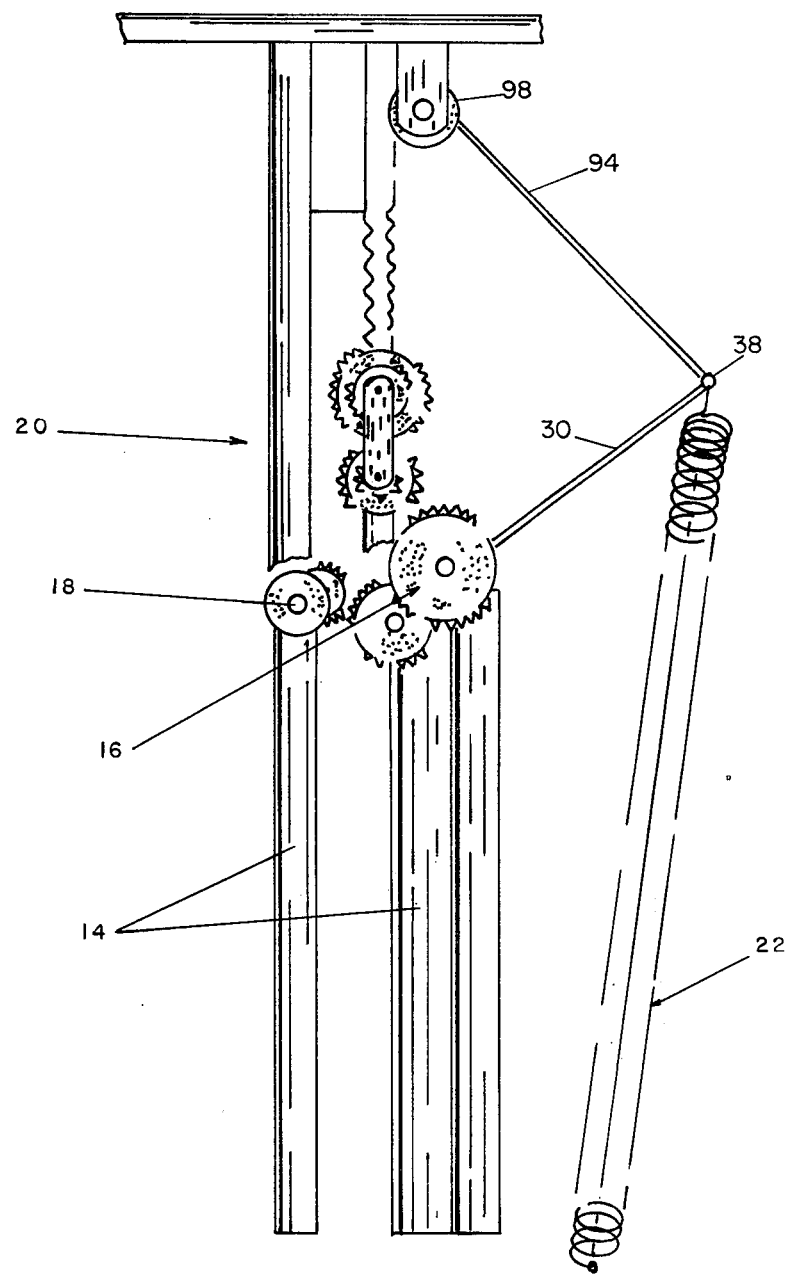
FIG. 2 is a side view of an energy mode.

As shown in FIG. 1, the mechanical energy device 10 of the present invention comprises twelve similar energy modules numbered 1 through 12 operatively mounted in frame 14. As shown in FIG. 2, energy energy module comprises a central crank shaft assembly 16, crank lifter assembly 18, crank speed control assembly 20 and power assembly 22 mounted on bottom support of frame 14 as more fully described hereinafter.

Due to the complex nature of the mechanical energy device 10, a brief discussion of the purpose and operation of the individual assemblies will assist in understanding the structure and operation of the device 10.

The central shaft assembly 16 and power assembly 22 create the mechanical motion of the mechanical energy device 10 during the power stroke of the individual energy modules.

Figure 3:
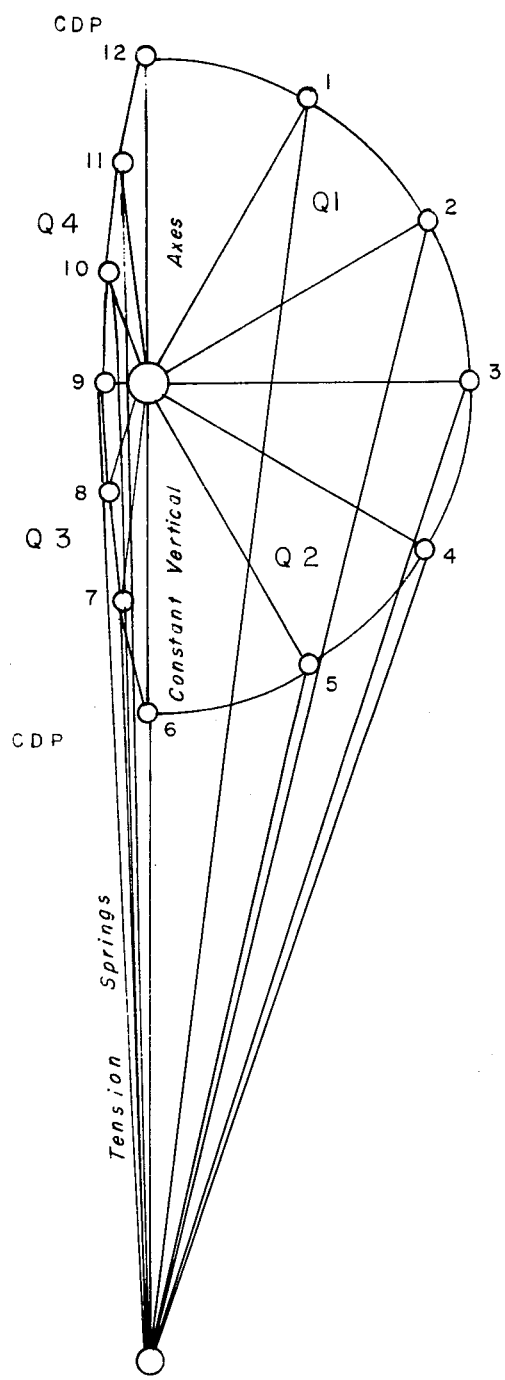
FIG. 3 is a schematic side view showing the travel of a crank during operation.

This operation can be best understood with reference to FIG. 3. Specifically, the twelve energy modules are operatively interconnected such that each energy module is oriented at 30 degree intervals relative to each other and transferred to a drive assembly 21 (FIG. 1). During the power stroke the crank of the central shaft assembly 16 follows a circular path in the first and second quadrants.

The crank lifter assembly 18 and crank speed control assembly 20 operatively control the movement of the corresponding energy module during the recovery stroke when the crank of the central shaft assembly 16 follows an elliptical path in the third and fourth quadrants.

The central shaft assemblies 16 are oriented at 30 degree deviations from each other by positioning the twelve cranks of the mechanical energy device 10. Starting at the top of the constant vertical axis, the path of travel comprises the circular path divided into six equal circular division points (1 through 6) and the elliptical path divided into six circular division points (7 through 12). The total clockwise turning movement exerted by the cranks in the power stroke is approximately three times as great as the total counter-clockwise turning moment exerted by the cranks in the recovery stroke.

The speed of the cranks in both the circular and elliptical paths are governed by the crank lifter and the crank speed control assembly such that the speed of the cranks in both paths is equal. Consequently, as one crank leaves its circular division point, the next adjacent crank rotates in its position. Thus, the total power of the five active cranks remains essentially constant in the mechanical energy device 10.

Figure 4:
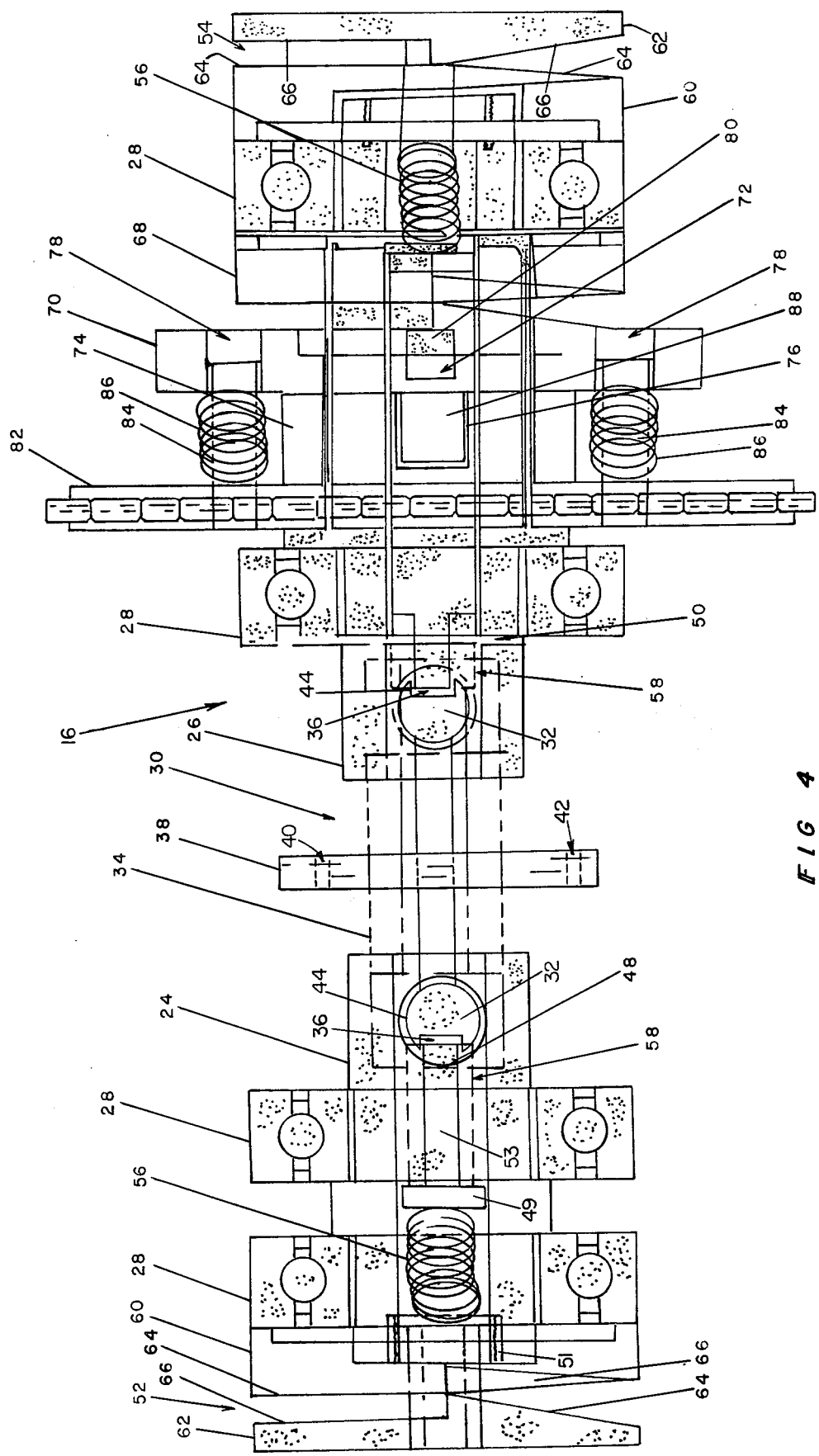
FIG. 4 is a cross-section side view of a central shaft assembly.
Figure 5:
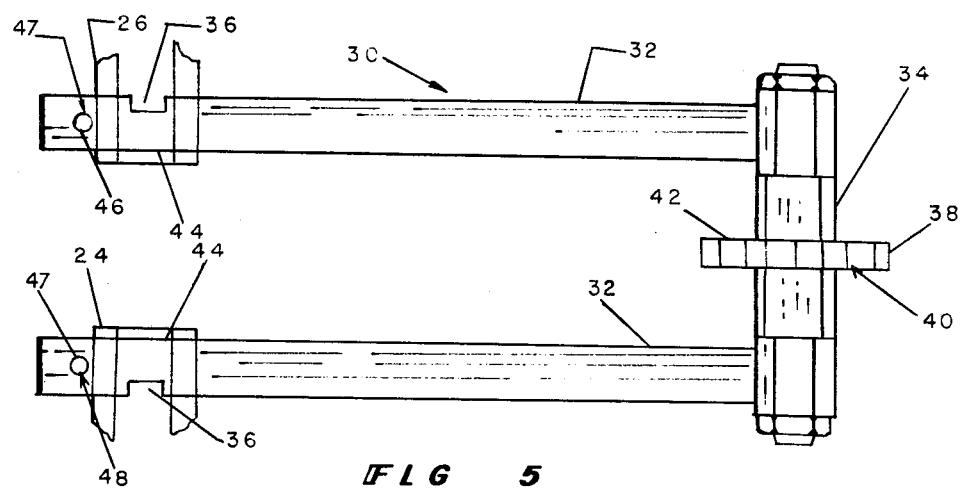
FIG. 5 is a side view of a crank.

As shown in FIG. 4, each central shaft assembly 16 comprises an interrupted central shaft, crank, lock means including a crank lock means and central gear lock means, and central gear as more fully described hereinafter. The interrupted central shaft includes a first and second shaft element 24 and 26 respectively, each mounted on a pair of central bearings 28. As best seen in FIG. 5, the crank generally indicated as 30 comprises a pair of substantially parallel crank arms 32 held in fixed spaced relation relative to one another by crank shoulder 34. The inner portion of crank arms 32 includes circular slots 36 which cooperate with the crank locking means as more fully described hereinafter. In addition, a retainer means 38 is mounted on the crank shoulder 34 to couple the power assembly and crank speed control assembly to the crank 30 as more fully described hereinabove. To accomplish this, apertures 40 and 42 are formed on opposite ends of the retainer means 38. As shown in FIGS. 4 and 5, the inner portions of the crank arms 32 extend through apertures 44 formed on the inner portions of the first and second shaft elements 24 and 26 and are secured thereto by pins 46 extending through apertures 47.

As shown in FIG. 4, the crank lock means comprises a first and second crank holder 48 and 50 respectively, first and second pair of separators 52 and 54, and a pair of compression springs 56. The first and second crank holders 48 and 50 are disposed within axially formed bores 58 within the first and second shaft elements 24 and 26 and are free to move laterally therein under the force of the compression springs 56 as more fully described hereinafter to control the arch of the crank 30. The outer portions 49 of the crank holders 48 and 50 are square in shape to pass through the square holes in the center of the shaft covers 51 while the opposite ends 53 thereof are circular in shape to extend through the circular slots 36 formed in the crank arms 32 as more fully described hereinafter.

The first and second separator pairs 52 and 54 each comprise a stationary separator 60 affixed to outer bearings 28 and rotating separator 62 attached to the outer end of the crank holders 48 and 50. As shown, each separator includes a raised or regulator portion 64 and corresponding recessed or sink portion 66 which operatively cooperate to control the lateral movement of the crank holders 48 and 50 as more fully described hereinafter.

As shown in FIG. 4, the central gear lock means includes a pair of central shaft separators including a stationary separator 68 attached to the central bearing 28 and a rotating separator 70 rotatably mounted on the central shaft 26. As shown, the rotating separator 70 has a key slot 72 on the inner side and a circular ring 74 with slots 76 on opposite face. It further includes two apertures 78 on either side of the center. The central shaft 28 includes a key 80 located at the center between separators 68 and 70. The central gear 82 includes two annular rods 84 fixed on opposite sides of the center and two compression springs 86 mounted therein. The two rods 84 extend through the two apertures 78 of the rotating separator 70 and the annular rings 88 of the central gear 82 and the rotating separator 74 engage each other. Separators 68 and 70 are similar to those previously described.

As previously described, the crank 30 rotates in a circular path with the central gear 82 and central shaft are interlocked by the crank lock means and control gear lock means in quadrants one and two during the power stroke. Then, the crank 30 follows an elliptical path in quadrants three and four during the recovery stroke when the central gear 82 separates from the central shaft as the central gear lock means and crank lock means move to the second position under the influence of the separators as described hereinafter.

Specifically, as the crank 30 rotates in the first and second quadrant, the regulators 64 and sinks 66 of the separators engage against the pressure of the crank holder compression springs 56. Consequently, the circular ends of the crank holders 48 and 50 fit into the circular slots 36 of the crank 30 and hold the crank 30 to the full radius. As the crank 30 moves in first and second quadrants the raised portion of the rotating separators 62 move onto the surface of the raised portion of the stationary separators 60 and gradually push the crank holders 48 and 50 out of the circular seats 36 so that when the crank 30 is on the constant vertical axis, CPD-6, the circular part of the crank holders 48 and 50 have been entirely removed from the slots 36 of the crank 30. Then, the crank arms 32 are free to move inwardly through the apertures 44 in the interrupted crank shaft to form the elliptical path in the third and fourth quadrants.

At the same time, raised portions of the rotating separator 70 reaches the sink of the stationary separator 68, the key 80 on the central shaft 26 and key slot 72 lock, locking the central gear 82 with the rotating separator 70 and central shaft together as one unit. This occurs when the crank 30 coincides CDP 12 and starts entering CDP 1. As the raised portion of the rotating separator 70 rotates on the stationary separator 68, it will be gradually pushed to the left side on the central shaft 26 and the key 80 on the central shaft 26 gradually leaves the key slot 72 at CDP 6. At this moment, the interrupted central shaft and the central gear 82 are mechanically separate and each rotates freely with one speed.

Since there may be a slight difference in the central gear 82 and central shaft when the crank 30 is moving upward in the elliptical path, it is desirable to reduce friction by providing a bearing of the aperture of the central gear 82 as it is mounted on the central shaft.

Moreover, modification of the several components may further reduce friction and therefore enhance the efficiency of the device 10. Specifically, the key 80 of the central shaft a roller mounted on the central shaft.

To further reduce the friction, the engaging surfaces of the separators may be reduced.

In addition, the central shaft assembly 16 may be modified to combine the crank lock means and central gear lock means.

In the alternate embodiment the separators of the central gear 82 are removed from the central shaft. Thus, the separators of the crank holder 58 on the right side end of the central shaft 26 can perform the actions of the separators of the central gear 82. This change permits the removal of 24 separators and twelve pair of compression springs. The remaining structure is essentially the same.

Figure 6:
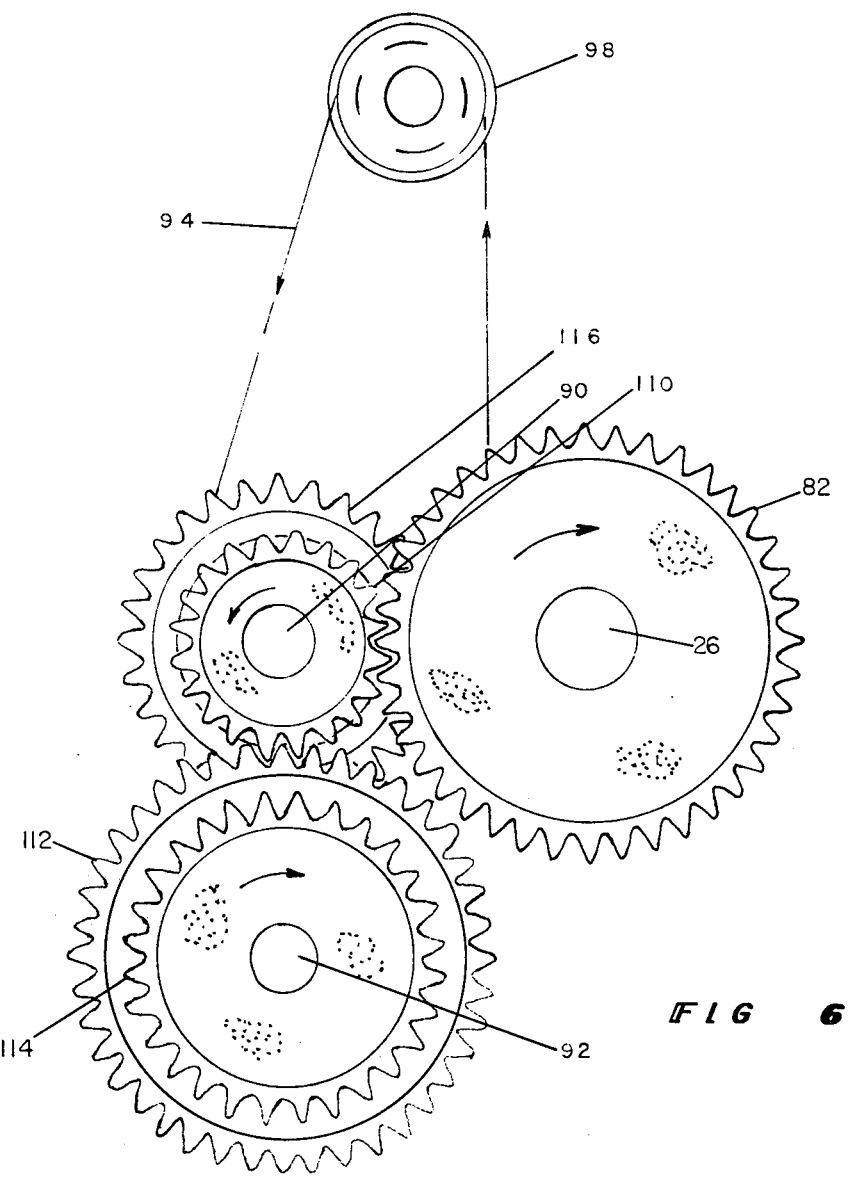
FIG. 6 is a schematic side view of a crank lifter assembly and central shaft assembly.
Figure 7:
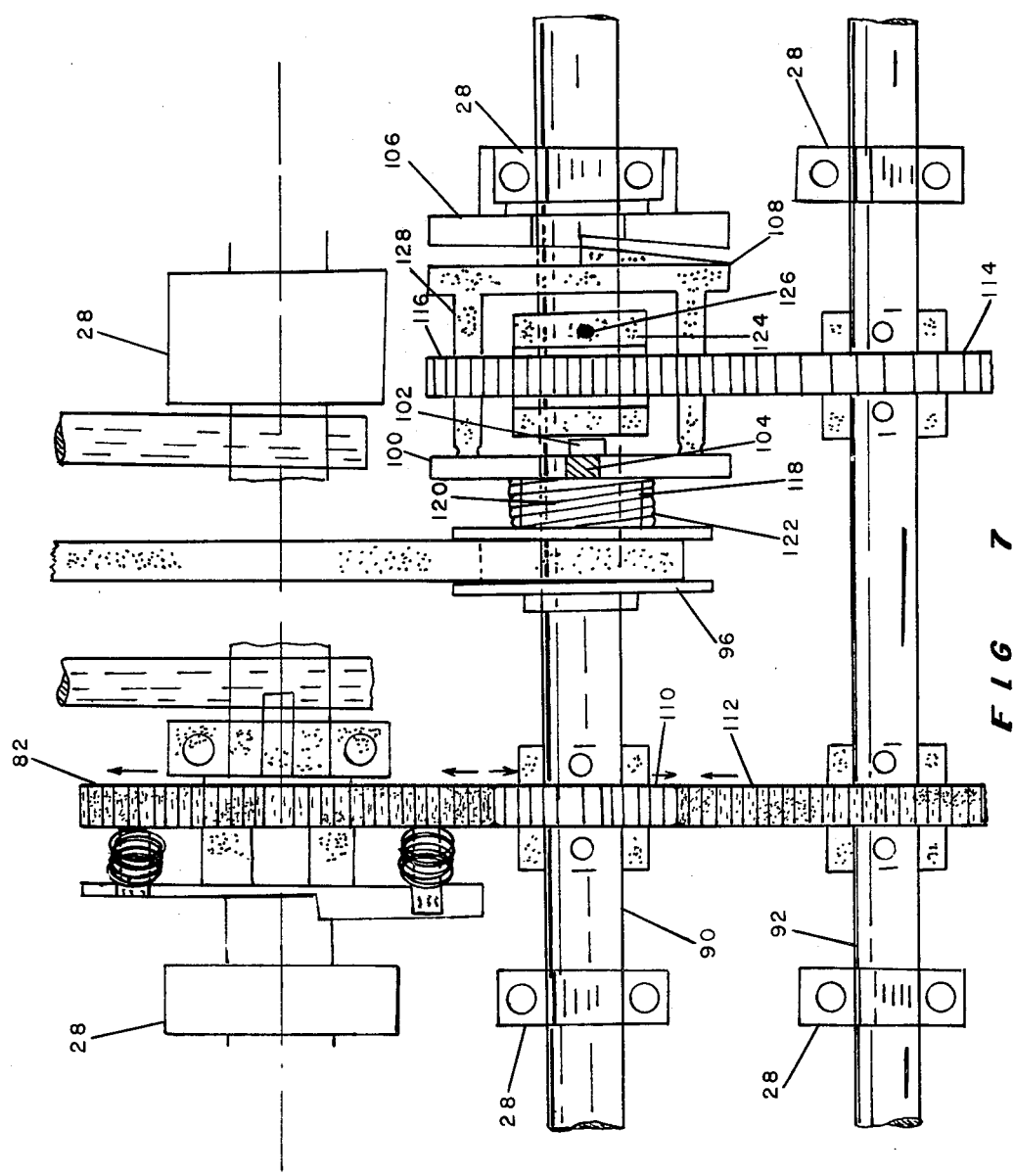
FIG. 7 is a schematic top view of a crank lifter assembly and central shaft assembly.

As shown in FIGS. 6 and 7 the crank lifter assembly 18 comprises main shaft 90, intermediate shaft 92, a coupling means including a first interconnecting element 94, pulley means including lifter take-up pulley 96 and upper guide pulley 98, crank lifter lock means including pusher plate 100, key 102, key slot 104, stationary and rotating separators 106 and 108 respectively, main gear 110 and gear train including first and second intermediate gears 112 and 114 respectively and separator gear 116.

The lifter take-up pulley 96, rotatably mounted on the main shaft 90, includes a circular ring on one side thereof including two circular slots 118 formed on the circumference thereof. The pusher plate 100, also rotatably mounted on the main shaft 90, includes the key slot 104. The left pusher plate 100 includes a circular ring having two circular slots 120 formed on the circumference thereof. The rings of the lifter take-up pulley 96 and the pusher plate 100 fit freely into the circular slots 118 and 120 of each other. A compression spring 122 is disposed between the pusher plate 100 and the lifter take-up pulley 96 on the circumference of the rings.

The separator gear 116 is rotatably mounted on the main shaft 90 between holding rings 124 which are fixed to the main shaft 90 by pins 126. The separator gear 116 includes two apertures on opposite sides of the main shaft 90. Separator rods 128 attached to the rotating separator 108 extends through the apertures of the face of the pusher plate 100. The stationary separator 106 is mounted on bearing 28. Separators 106 and 108 are similar to those previously described.

Main shaft 90 and intermediate shaft 92, substantially parallel to the central shaft, are rotatably mounted on bearings 28 disposed at opposite ends of each shaft. Gears 110, 112 and 114 are mounted between holding rings 124 which are fixed to their respective shafts by pins 126.

As previously described the central gears 82 and the five cranks 30, in the power stroke (CDP 12 and CDP 6) transmit power to the main gear 110 and the gear train of the crank lifter assemblies 18 of the energy modules in the recovery stroke to operate the crank lifter lock means as more fully described hereinafter.

Specifically the main shaft 90 and the main gear 110 rotate continuously at a substantially constant speed. This in turn rotates the gear train. Due to the gear ratios main gear 110 rotates one revolution with the main shaft while the separator gear 116 rotates half a revolution through the gear train.

The compression spring 122 continuously presses the pusher plate 100 against rods 128 of the rotating separator gear 116. As the separator gear 116 rotates in the counter-clockwise direction it rotates rods 128 and the rotating separator 108. Thus in each half revolution of the separator gear 116 the regulator of the rotating separator 108 rotates on the flat surface of the stationary separator 106 and in the other half revolution the regulator of the rotating separator 108 will be pushed by the pusher plate 100 into the sink of the stationary separator 106 and move 180 degrees on the gradient part of the stationary separator 106 and then again falls on the flat surface.

As the regulator engages the gradient part, the pusher plate 100 moves to the right on the main shaft 90. Consequently the key 102 on the main shaft 90 engages the key slot 104 of the pusher plate 100 and locks the pusher plate 100 and lifter take-up 96 to the main shaft 90 which then rotates as a mechanical unit.

As the lifter take-up pulley rotates one revolution, the regulator of the rotating separator 108 has rotated half a revolution on the gradient part of the stationary separator 106 and has reached the beginning of the flat surface on the stationary separator 106. Consequently, the pusher plate 100 is pushed to the left on the main shaft 90 and the key 102 disengages the key slot 104. Then the lifter take-up pulley 96 and pusher plate 100 rotate freely on the main shaft 90. As a result the pulley 96 is free to rotate with the crank 30 in a clockwise direction on the main shaft 90 as more fully described hereinafter.

As shown, the first interconnecting element 94 is attached to the retainer means 38 of the crank 30 at one end passed over the circumference of the upper guide pulley 98 and attached to the circumference of the lifter take-up pulley 96 at the opposite end. Since the pulley 96 has a six inch circumference, as the main gear 110 rotates one revolution in the counter-clockwise direction, pulley 96 takes up six inches of the first interconnecting element 94 around its circumference. As a result, the first interconnecting element 94 pulls the crank 30 upward from CDP6 to CDP9, six inches in vertical height or half the required height. In the next revolution of the main gear 110, the pulley 96 is unlocked from the main shaft 90 as previously described. Thus without more the power assembly 22 would pull the crank 30 back to CDP6.

Figure 8:
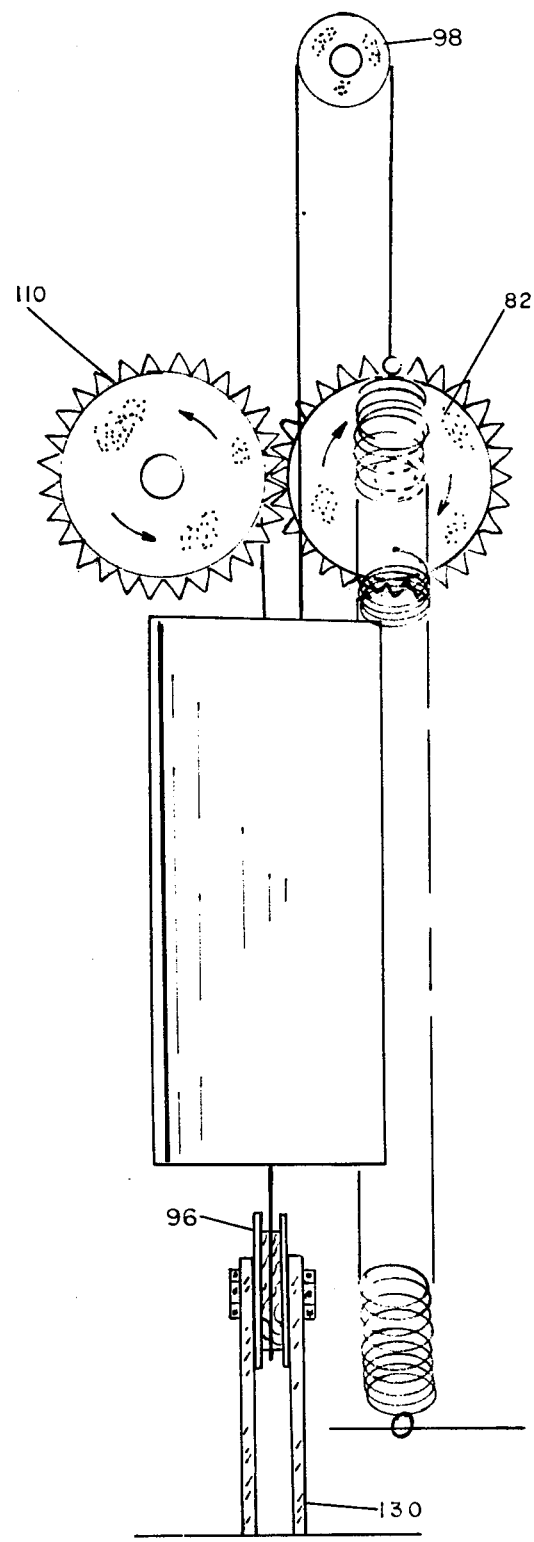
FIG. 8 is a side of an alternate crank lifter assembly and crank speed control assembly.

As described more fully hereinafter, the crank speed control assembly 20 as shown in FIG. 8 is placed between the crank lifter pulley and the guiding pulley to pull the crank 30 through the required twelve inches in vertical movement.

FIG. 8 shows an alternate embodiment of the crank lifter assembly 18. The central gear 82 and the main gear 110 have an equal diameter of twelve inches and an equal number of teeth. This alternate permits the removal of the gear train and attendant friction.

In addition the lifter take-up pulley 96 has a circumference of twelve inches. Thus, in half a revolution of the alternate main gear 110, the pulley 96 locks with the main shaft 90 and rotates half a revolution with the main gear 110 in a counter-clockwise direction taking up six inches of the second interconnecting element of the crank 30 to be lifted upward from CDP6 to CDP12 in the elliptic path as more fully described hereinafter.

As described the next half revolution of the pulley 96 releases the pulley 96 so that it is free to rotate on the main shaft 90. At this moment the crank 30 starts pulling the first interconnecting element 94 with it along the circumference of the circular part thus causing the pulley 96 to be rotated in a clockwise direction for half a revolution paying out six inches from the crank speed control assembly 20.

Thus the alternate main gear 110 and pulley 96 in the alternate crank lifter assembly 18 perform the same function of the previous main gear 110 and the pulley 96 in the basic crank lifter assembly 18.

As shown a second or lower guide pulley 130 may be added with the crank speed control assembly 20 to position the central assembly below the crank 30.

Figure 9:
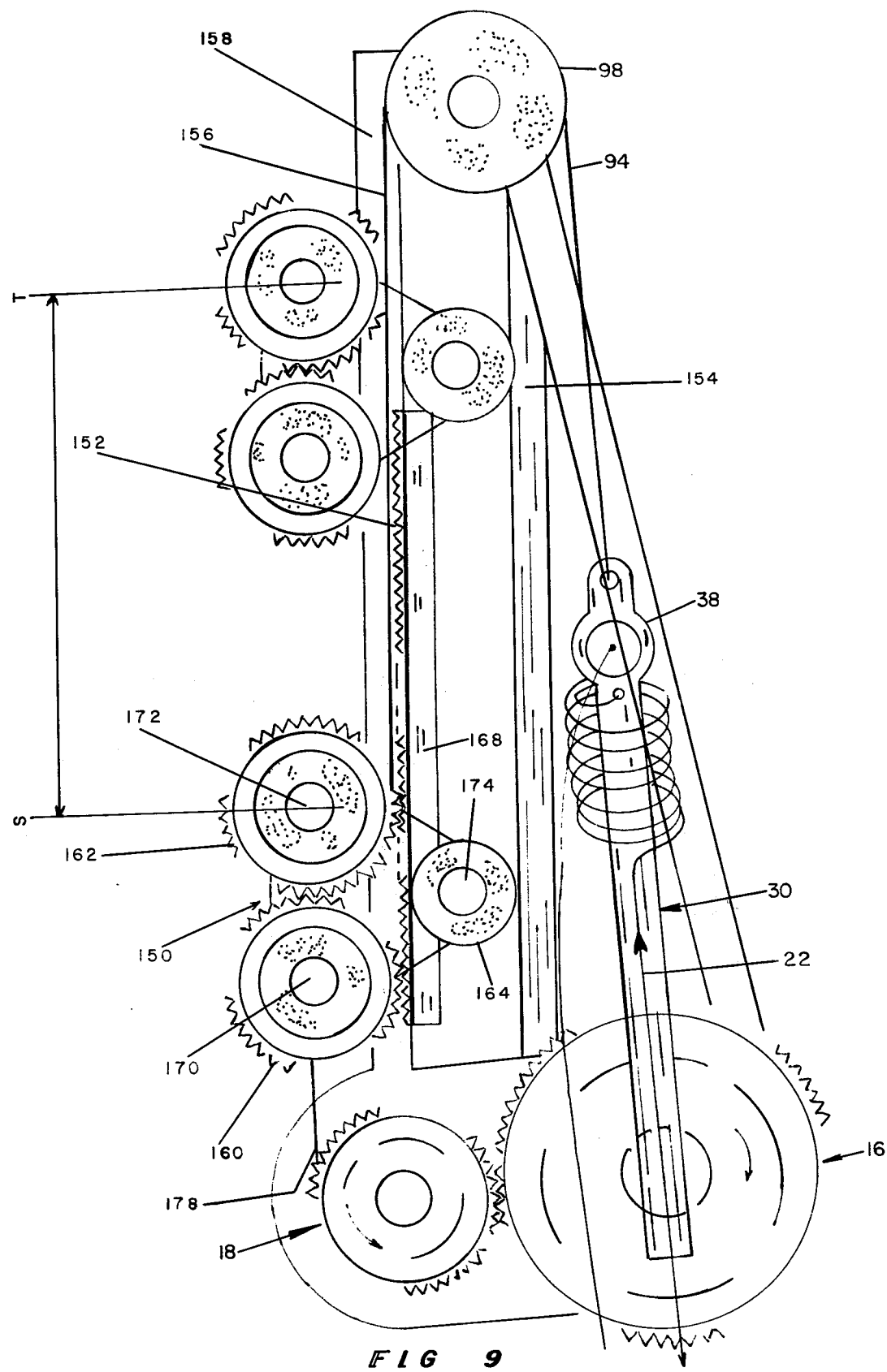
FIG. 9 is a side view of a crank speed control assembly.

As shown in FIG. 9, the crank speed control assembly 20 comprises crank governor assembly generally indicated at 150, governor rack 152, governor rail 154, first governor or upper interconnecting element 156 and governor support 158 which is mounted on frame 14. The crank governor assembly 150 comprises two pair of substantially parallel gears 160 and 162 in combination with a pair of substantially parallel rollers 164 mounted on end plates 168 by shaft means 170, 172 and 174 respectively. In addition governor pulley 176 is mounted on shaft means 172. Governor gears 160 and 162 are disposed to ride on parallel tracks 152 between points S and T as indicated. Similarly rollers 164 are disposed to ride on substantially parallel governor rails 154 as shown.

As previously stated the crank lifter assembly 18 and crank speed control assembly 20 rotate the crank 30 through the third and fourth quadrant along CDP6 through CDP12.

As described the crank lifter assembly 18 rotates continuously in a counter-clockwise direction. With the crank speed control assembly 20 operatively coupled between the power assembly 22 and crank lifter assembly 18, governor element 156 is passed over first guide pulley 98 having one end attached to pulley 176 disposed between substantially parallel gears 162 of the crank speed control assembly 20 and the opposite end attached to the retainer means 38. In addition the second governor or lower interconnecting element is attached to the center of shaft means 170 between substantially parallel gears 160 having its opposite end attached tangentially to the pulley 96 mounted on the main shaft 90 as previously described.

In operation when the crank speed control assembly 20 is disposed at the upper limit with the center line of gears 162 on line T, the center of the crank 30 is located at CDP6 starting into the third quadrant. At this moment the crank lifter assembly 18 begins to pull upwardly on the crank 30 from CDP6 through the third and fourth quadrant. Simultaneously the upper and lower interconnecting elements 156 and 178 are take-up on pulley 176 and 96 respectively pulling the crank speed control assembly 20 downwardly until the center of the gears 162 coincide with S. Thus, the action of the crank lifter assembly 18 and the crank speed control assembly 20 creates a twelve inch vertical movement of the crank 30 through the third and fourth quadrant.

With the crank speed control assembly 20 located at its lower limit and the corresponding crank 30 passing CDP 12 pulley 96 disengages the lock means of the crank lifter assembly 18 allowing upper and lower interconnecting elements 176 and 96 to pay out under the force of the crank 30 entering the power stroke. This pulls the crank speed control assembly 18 upwardly toward its upper limit T. Then, as corresponding crank 30 reached CDP6 the crank speed control assembly 20 reaches its upper limit to T where again the crank lifter assembly lock means again engages the pulley 96 to again pull the crank 30 through the third and fourth quadrant as previously described.

As shown in FIG. 8, the crank speed control assembly 20 may be located below the main gear 110 and the crank lifter assembly 18 by adding a lower guide pulley 130. In this configuration, the lower interconnecting element 178 passed under guiding pulley 130. No modification is of the remaining structure. Thus, it performs essentially the same operation described in the previous drawings. The only difference is that in pulling the crank 30 upward in the elliptic path, the crank speed control assembly 20 is pulled upward from line S to T and when the crank 30 rotates in the circular path, the crank speed control assembly 20 moves downward from line T to S.

Figure 10:
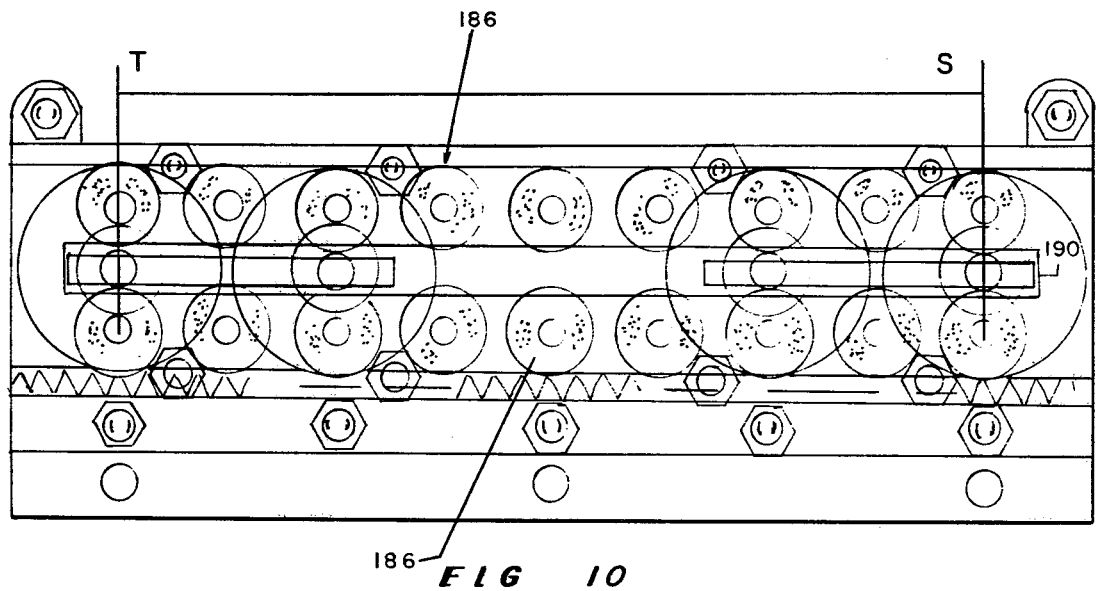
FIG. 10 is a side view of an alternate crank speed control assembly.
Figure 11:
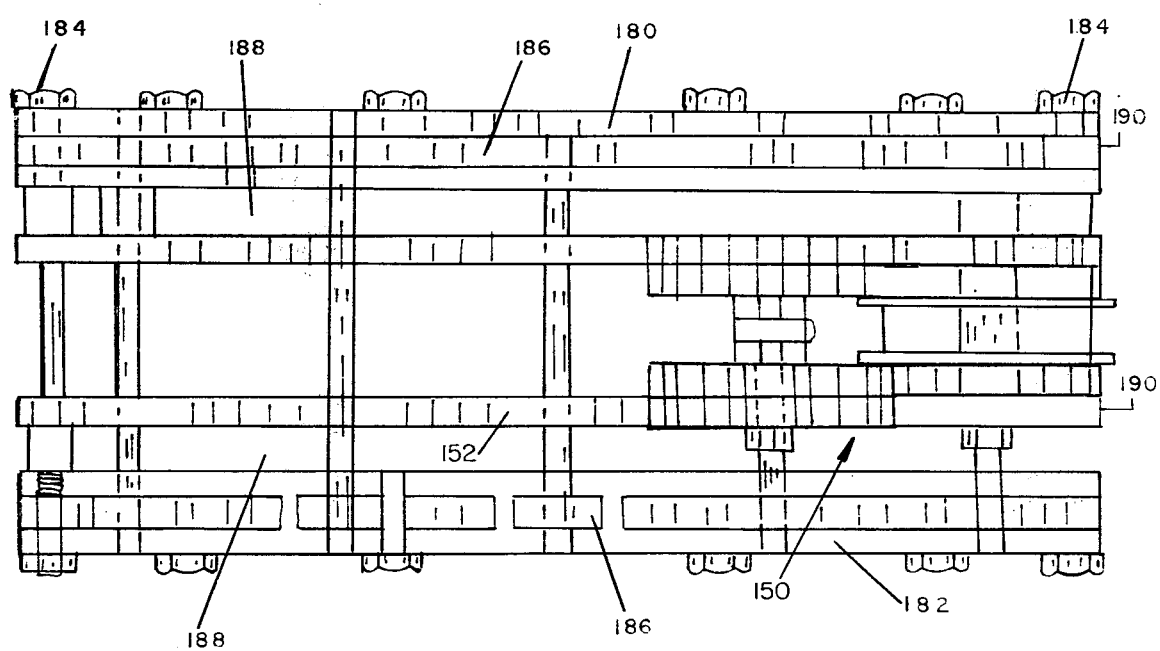
FIG. 11 is a top view of an alternate crank speed control assembly of FIG. 10.

FIGS. 10 and 11 show an alternate crank speed control assembly 20. The crank speed control assembly 20 includes crank governor assembly 150 having gears similar to those previously described.

The governor support comprises as substantially rectangular structure including sides 180 and 182 coupled by bolts 184 at opposite ends thereof. A plurality of rollers 186 are rotatably attached to the interior walls of sides 180 and 182 on opposite sides of guide rail 188. The gears are attached to sliders 190 on the opposite side to move freely between the rollers 186 between T and S, along rail 188. The front and rear gears are designed so that only half of the widths of the front gears place on the racks 152 and the other half drive the rear gears between the racks without contacting the racks 152.

Figure 13:
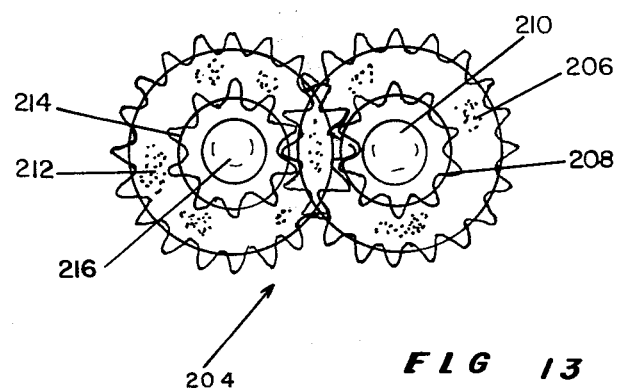
FIG. 13 shows a side of the gears of the alternate power assembly of FIG. 12.
Figure 12:
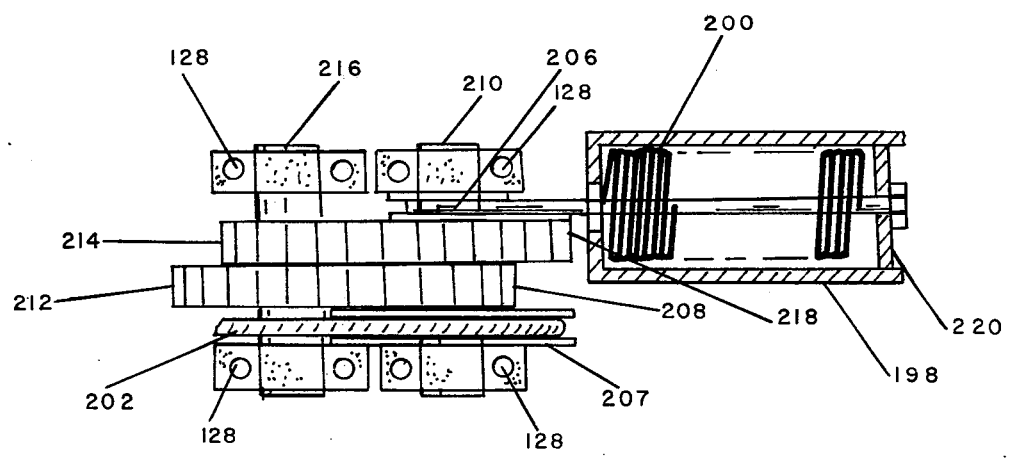
FIG. 12 shows top view of an alternate power assembly.

As previously described, the power assembly 22 may comprise a tension spring 194 tieing means 196 (FIG. 14) to create the motive power of the mechanical energy device 10. The length of these tension springs 194 must be twice the length of the cranks 30 and tying means 196 must be located more than twelve inches below on the circular division point 6 on the constant vertical axis. Thus, the height of the overall structure of the mechanical energy device 10 is increased. FIGS. 12 and 13 show an alternate power assembly 22 comprising a cylindrical hollow spring pump 198, compression spring 200 coupled to the crank 30 by a wire coupling means 202, gear train 204 and power drive pulley 206 and power active pulley 207.

As shown in FIG. 13, the gear train 204 includes gear 208 fixed to pulley 207 both being fixed on shaft 210, gears 212 and 214 mounted on shaft 216 and gear 218 fixed to pulley 206 can rotate freely on shaft 210.

When gear 208 and pulley 207 rotate two revolutions in either direction gears 212 and 214 rotate one revolution. In turn, gear 214 contacts gear 218 driving pulley 206 one half revolution. Consequently, in the gear train when the pulley 207 rotates two revolutions in any direction, pulley 206 rotates one half revolution in the same direction.

Shafts 210 and 216 are substantially parallel to each other and rotatably mounted on bearings 128 located on opposite ends thereof. The central line of the spring pump 198 and the circumferential center line of the pulley 206 are aligned. As shown, one end of the wire line 202 is attached to a washer 220 and the other end is attached to the circumference of the pulley 206.

Pulley 207 will take up the twelve inches of wire line 202 around its circumference in two revolutions in a counter-clockwise direction.

The structure of this alternate power assembly generally decreases the height of the overall structure making the mechanical energy device 10 more practical in various industrial applications.

Figure 14:
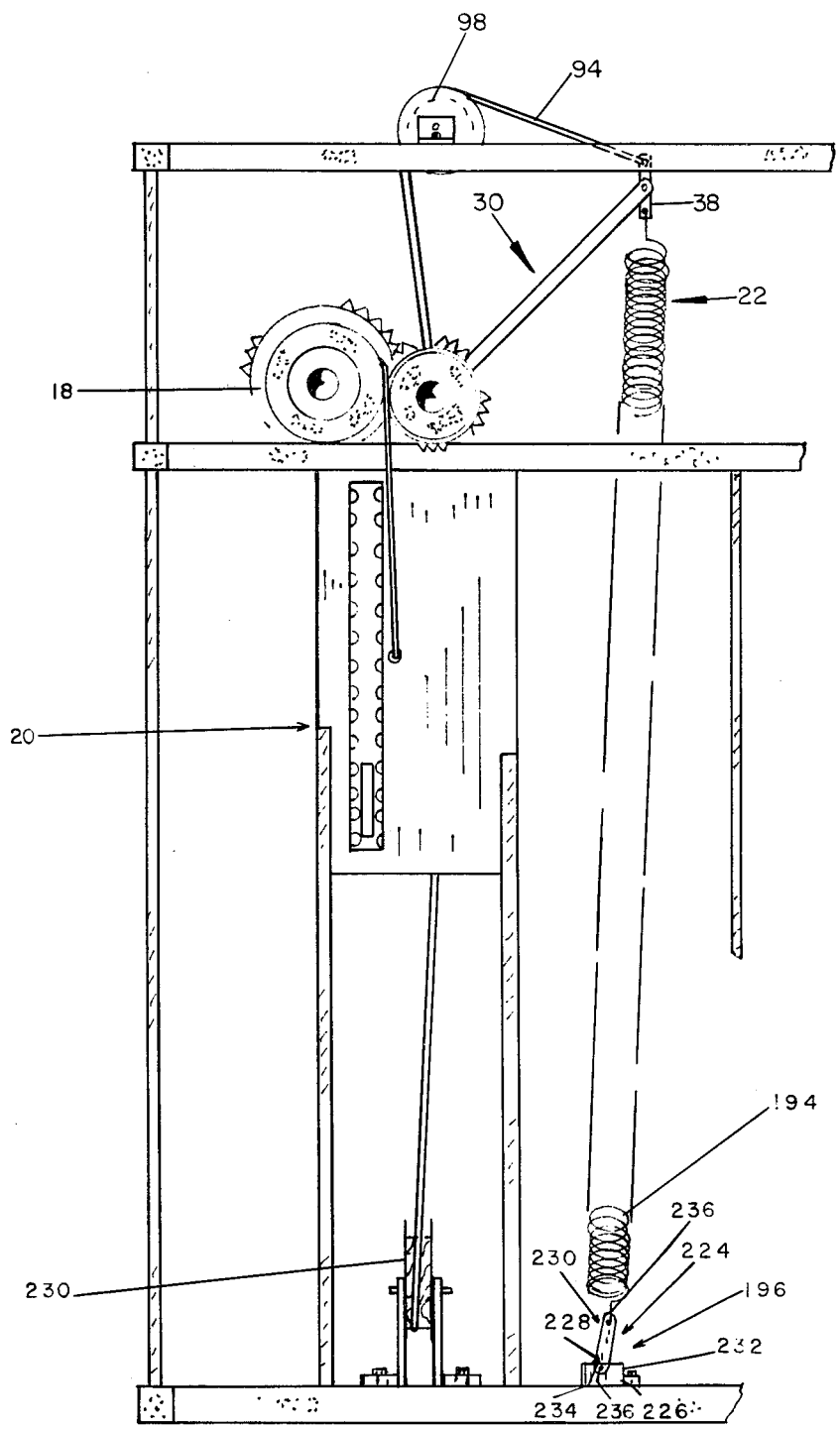
FIG. 14 is a side view of an alternate mechanical energy module.

FIG. 14 shows an alternate tying means generally indicated as 196 for use with the tension spring 194. The tying means 196 comprises tongue 224 and base plate 226. The tongue 224 includes apertures 228 and 230 formed on opposite ends thereof. The base plate 226 includes slot 232 and aperture 234 formed therein. The tongue 224 is pivotally mounted in slot 232 by passing a bolt 236 through the apertures 228 and 234 and attaching a fastening means to the opposite end of the bolt 234. The tension spring 194 is then attached to the opposite end of the tongue 224 by passing hook 236 through aperture 230.

In addition, the alternate tying means is disposed to the right of circumference of the top guide pulley to insure that the crank 30 follows an elliptical path from circular division point 6 through circular division point 12.

Figure 15:
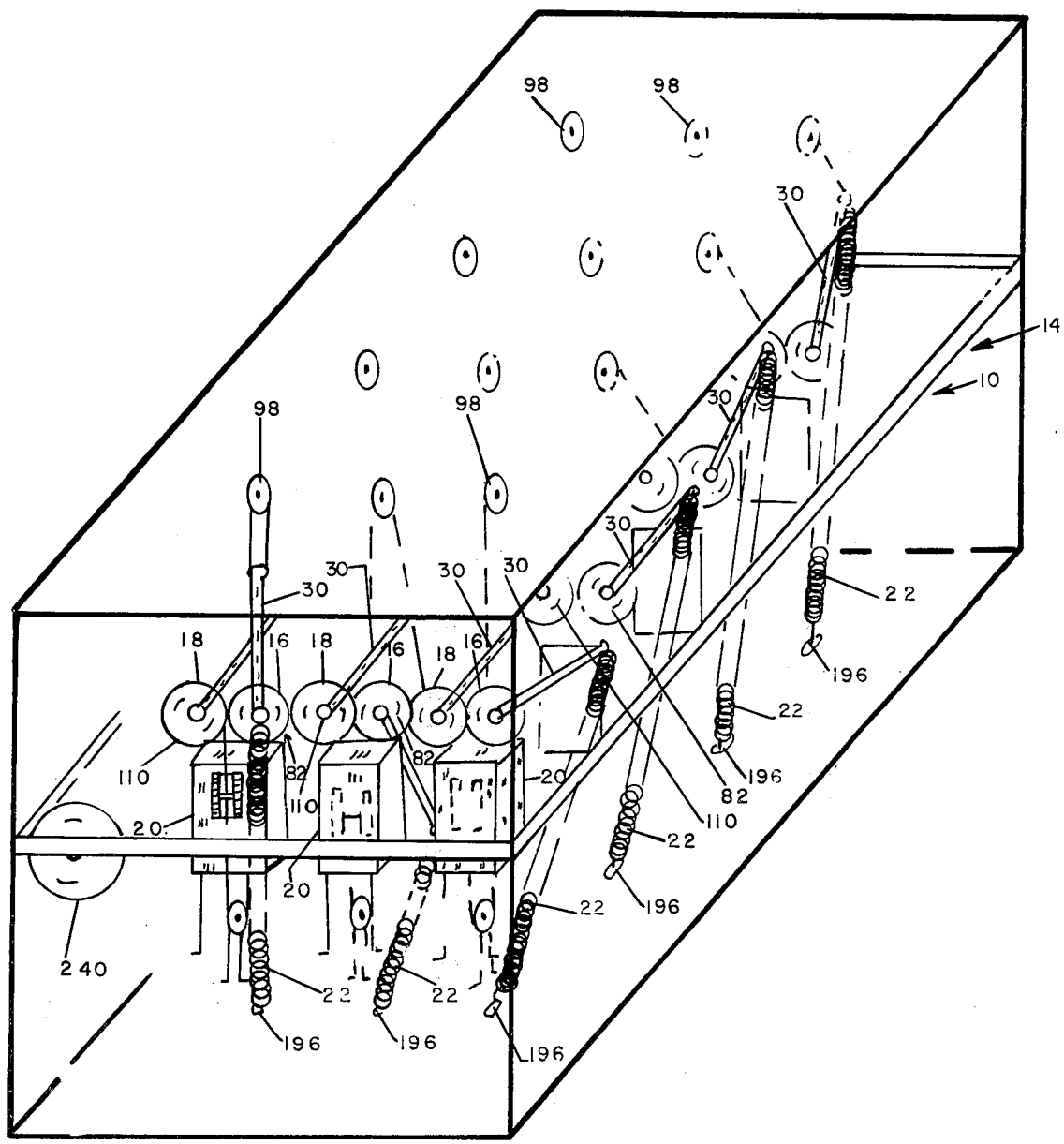
FIG. 15 is an isometric view of a mechanical energy device.

The overall operation of the various embodiments previously described in individual component description is best shown in FIGS. 2 and 14 illustrating single energy modules and the isometric view of mechanical energy device shown in FIG. 15.

As previously described, the crank 30 rotates in a a circular path with the crank 30, central gear 82, central shaft interlocked by the crank lock means and control gear lock means in quadrants one and two during the power stroke. Then the crank 30 follows an elliptical path in quadrants three and four during the recovery stroke when the central gear 82 separates from the central shaft as the central gear lock means and crank lock means moves to the second position under the influence of the separators as previously described.

Simultaneously, the crank lifter assembly lock means locks the crank lifter take-up pulley 96 to the main shaft 90 taking up the lower interconnecting element 178 thereon pulling the crank speed control assembly 20 from T toward S taking up upper interconnecting element 156 on governor pulley 176. This continues throughout the travel of the crank 30 from CDP6 to CDP12 as the twelve inches of interconnecting elements 156 ah d 178 corresponding to the twelve inches of upward vertical travel of the crank 30 during the recovery stroke.

As previously described, the plurality of energy modules are operatively interconnected intermediate gears or intermeshing main and central gear. Thus, each energy module is mechanically coupled to each other on the plurality of energy modules. As a result, each of the three main shafts 90 are continuously rotating under the power of the five active crank shaft assemblies 16. As shown in FIG. 1, power is taken off the output drive means comprising the three pulley means 240 mounted on the main shafts 90 interconnected by continuous power connecting means 242 which may be coupled by the stated mechanical means to provide energy output from the overall machine.

Thus, once the mechanical energy device 10 is generated, a limited power of mechanical energy output is generated until the initial energy input is abated after a long period of time.

In this manner, an efficient, reliable mechanical energy device is provided.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language might be said to fall therebetween.

Now that the invention has been described, what is claimed is:

1. A mechanical energy device comprising a plurality of energy modules mounted on a frame, said plurality of energy modules operatively interconnected to each other to cooperatively generate a mechanical energy output in response to a mechanical energy input, each said energy module comprising a central shaft assembly and power assembly operatively interconnected to generate a power stroke, a crank lifter assembly to generate a recovery stroke and a drive assembly coupled to said crank lifter assembly to generate the mechanical energy output during said power stroke; said central shaft assembly comprising a central shaft rotatably mounted on said frame, a crank attached to said central shaft and a central gear and central lock means mounted on said central shaft, said crank lifter assembly comprising a main shaft disposed substantially parallel to said central shaft, a first interconnecting element, a pulley means including a lifter take-up pulley rotatably mounted on said main shaft and a crank lifter lock means, said power assembly coupled between said crank and said frame to control the movement of said crank during said power stroke, and said drive assembly operatively coupled to said crank lifter assembly to couple said mechanical energy device to external machinery to power the external machinery, said central lock means movable between a first and second position, said central lock means locking said crank and said central gear to said central shaft to rotate as a unit when in said first position during said power stroke and unlock said crank and said central gear from said central shaft to rotate independent of each other when in said second position during said recovery stroke, said crank lifter lock means movable between a first and second position, said crank lifter lock means locking said lifter take-up pulley to said main shaft when in said first position to rotate as a unit when in said first position during said recovery stroke and unlock said lifter take-up pulley from said main shaft to rotate independent of each other when in said second position during said power stroke.

2. The mechanical energy device of claim 1 further including a crank speed control assembly coupled between said crank lifter assembly and said central shaft assembly to cooperate with said crank lifter assembly to generate said recovery stroke, said crank speed control assembly comprising a governor support attached to said frame, a governor rail attached to said governor support a governor rack mounted on said governor rail, an upper and lower governor interconnecting element and a crank governor assembly movable between a first and second position mounted on said governor rail, said crank governor assembly including a governor pulley, said upper governor interconnecting element coupled between said governor pulley and said crank, said lower governor interconnecting element coupled between said crank governor assembly and said pulley means whereby said upper and lower governor interconnecting elements take-up on said governor pulley and said pulley means respectively, during said recovery stroke as said governor assembly moves from said second position to said first position and said first and second upper and lower governor interconnecting elements pay out from said governor pulley and pulley means respectively during said power stroke as said governor assembly moves from said first position to said second position.

3. The mechanical energy device of claim 1 wherein said crank comprises a pair of crank arms held in fixed spaced relation relative to one another by a crank shoulder attached to the outer ends thereof and said central shaft comprises an interrupted shaft including a first and second shaft element attached to opposite parallel crank arms, said first and second shaft elements each including apertures formed on the inner portion thereof, said crank arms extending through said apertures and movable disposed therein, the inner portion of said crank arms including slots formed therein, said central lock means including a crank lock means comprising a pair of crank holders movably disposed within axially formed bores within first and second shaft elements and compression springs disposed on the outer portion of said crank holders and a first and second pair of separators disposed at opposite ends of said first and second shaft element, each said pair of separators comprising a first and second separator, said first separator attached to said frame and second separator rotatably mounted on the outer end of said crank holders, each said separator including a regulator portion and a corresponding sink portion to operatively cooperate to control the lateral movement of said crank holders during rotation of said interrupted central shaft such that rotation of said interrupted central shaft urges said rotating separators forcing said crank holders inwardly to extend through said apertures formed on the inner end of said crank arms to hold said crank in circular path during said power stroke and said compression springs urge said first and second crank holders outwardly relative to said parallel crank arms withdrawing said crank holders from said apertures formed in said crank arms to permit movement of said crank arms relative to said interrupted first and second shaft elements when in said recovery stroke to follow an elliptical path.

4. The mechanical device of claim 3 wherein said lock means further includes central gear lock means comprising a slot formed in said rotating separator of said second shaft element and a key formed on said second shaft element such that during rotation said key enters in said key slot to lock said central gear with said rotating separator and said central shaft to rotate as a unit during said power stroke.

5. The mechanical device of claim 1 wherein said crank lifter lock means comprises a stationary separator mounted on said frame and a rotating separator mounted on said main shaft, a pusher plate including a key slot formed thereon rotatably mounted on said main shaft and said main shaft including a key formed thereon, said rotating separator including at least one rod disposed to engage said pusher plate, and compression springs disposed between said pusher plate and said lifter take-up pulley, said stationary and rotating separator each including a regulator portion and a corresponding sink portion to operatively cooperate to control the lateral movement of said pusher plate during rotation of said main shaft such that rotation of said main shaft urges said rotating separator inwardly such that said key enters said key slot to lock said lifter take-up pulley to said main shaft during said recovery stroke.

6. The mechanical energy device of claim 1 wherein said crank lifter assembly further includes an upper guide pulley attached to said frame, and first interconnecting element extending over said first guide pulley.

7. The mechanical energy device of claim 1 wherein said power assembly comprises a spring coupled to said crank at its upper end and to said frame at its lower end, said frame further including tying means attached to said frame, said tying means including a base plate affixed to said frame and a tongue movably attached thereto, said spring attached to said tongue.

8. The mechanical energy device of claim 1 wherein said power assembly comprises a cylindrical hollow spring pump attached to said frame, said cylindrical hollow spring having a compression spring disposed therein and a wire coupling means including a first and second element, a gear train and pulley means, said pulley means including power drive pulley and a power active pulley, said first element coupled between said compression spring and said power drive pulley, said second element coupled between said power active pulley and said crank, said power drive pulley and said power active pulley mechanically coupled together by said gear train such that said compression spring controls the movement of said crank through said pulley means and said gear train.

9. The mechanical energy device of claim 1 wherein said drive assembly comprises a pulley means attached to each said main shaft, each said pulley means interconnected to each other to rotate together.

* * * * *